United States Patent [19]

Toyoda

[11] Patent Number: 5,244,955
[45] Date of Patent: Sep. 14, 1993

[54] RUBBER COMPOSITION

[75] Inventor: Keiji Toyoda, Yokohama, Japan

[73] Assignee: Nippon Zeon Co., Ltd., Tokyo, Japan

[21] Appl. No.: 858,508

[22] Filed: Mar. 27, 1992

[30] Foreign Application Priority Data

Mar. 27, 1991 [JP] Japan .................................. 3-085953

[51] Int. Cl.$^5$ .......................... C08K 3/22; C08K 5/09
[52] U.S. Cl. .................................. 524/397; 524/399; 524/432
[58] Field of Search ..................... 524/397, 399, 432

[56] References Cited

U.S. PATENT DOCUMENTS 3,823,122  7/1974  Schuh et al. ...................... 524/397
5,126,501  6/1992  Ellul .................................. 524/399

Primary Examiner—Kriellion S. Morgan
Attorney, Agent, or Firm—Sherman and Shalloway

[57] ABSTRACT

There is provided an ethylenically unsaturated lower carboxylic acid metal salt-containing rubber composition having good mold releasability.

This rubber composition is composed of preferably 5 to 100 parts by weight of an ethylenically unsaturated lower carboxylic acid salt preferably and 1 to 10 parts by weight of a higher fatty acid metal salt compounded with 100 parts by weight of rubber. Preferably 20 parts by weight or less of zinc oxide may further be compounded thereinto.

Compared with conventional vulcanizates prepared using a mold coated with a mold release agent and vulcanizates prepared from a rubber composition to which silicone oil or the like was added, vulcanizates from the present rubber composition are ones wherein lowering of characteristics such as strength due to inclusion of these compounds is small and which have improved mold releasability.

17 Claims, No Drawings

RUBBER COMPOSITION

This invention relates to a rubber composition excellent in mold releasability. More detailedly, this invention relates to an ethylenically unsaturated lower carboxylic acid salt-containing rubber composition excellent in mold releasability.

When rubber poor in mold releasability is molded and processed, devices have so far been made, for example to select a mold of appropriate material (steel material, stainless steel, aluminum or the like), plate the mold surface (chromium plating, nickel plating, electroless nickel plating, nickel plating/Teflon coating or the like), coat the mold with a mold release agent (a silicone compound, fluorine compound or the like) or add to the rubber various compounds (fatty acid ester, silicone oil, paraffin, low molecular weight polytetrafluoroethylene or the like).

However, these methods are not sufficiently satisfactory. For example, in case of use of a mold subjected to nickel plating/Teflon coating, although excellent mold releasability is obtained, there arise disadvantages ① that this method is expensive, ② the metallic deposit is peeled in several hundred shots or less, ③ this method cannot be adopted in some uses of articles because irregularity is formed on the surface of articles, and so on. Further, there are disadvantages in methods comprising applying a mold release agent, for example ① that its effect disappears in several times repeated moldings, ② nonuniformity is formed on the surface and ③ fusion failure takes place. Further, methods comprising adding various compounds have a problem that characteristics of the rubber articles are lowered by inclusion of these compounds thereinto.

Particularly, in case of rubber compositions into which an ethylenically unsaturated lower carboxylic acid metal salt was compounded, since although they are excellent in strength characteristics, etc., they are extremely poor in mold releasability, there has been no method other than one wherein a mold release agent is used in a large amount at the sacrifice in some extent of characteristics of rubber articles, or one wherein nickel plating/Teflon coating of the mold is repeated with resignation to economical disadvantage.

Thus, an ethylenically unsaturated lower carboxylic acid salt-containing rubber composition has been desired capable of giving in a low cost rubber articles having excellent strength characteristics, etc. and a fine surface.

The object of this invention lies in providing an ethylenically unsaturated lower carboxylic acid metal salt-containing rubber composition having good mold releasability and thus having no above problems.

As a result of intense study for attaining the above object, the present inventor found that it is possible to improve mold releasability with maintenance of the characteristics of rubber articles by compounding certain compounds into an ethylenically unsaturated lower carboxylic acid metal salt-containing rubber composition, and completed this invention based on this finding.

Thus according to this invention, an ethylenically unsaturated lower carboxylic acid metal salt-containing rubber composition is provided comprising (A) rubber, (B) an ethylenically unsaturated lower carboxylic acid metal salt and (C) a higher fatty acid metal salt, and optional (D) zinc oxide.

Rubber used in this invention is not particularly limited, and can be rubber generally used for preparation of various rubber articles. Such rubbers include natural rubber, polyisoprene rubber, polybutadiene rubber, chloroprene rubber, isobutylene-isoprene copolymer rubber, styrene-butadiene copolymer rubber, nitrile-butadiene copolymer rubber, hydrogenated nitrile-butadiene copolymer rubber, ethylene-propylene-diene copolymer rubber, etc. Particularly, when hydrogenated nitrile-butadiene copolymer rubber is used as rubber, rubber compositions very excellent in strength characteristics can be obtained.

Ethylenically unsaturated lower carboxylic acid metal salts used in this invention may be those having such structure that an ethylenically unsaturated carboxylic acid having 1 or 2 or more carboxyl groups and 5 or less carbon atoms and a metal are linked through ion bond. Ethylenically unsaturated lower carboxylic acids may be substituted with a functional group, and in that case the number of carbon contained in the functional group is not included in the above carbon number.

Examples of ethylenically unsaturated lower carboxylic acids are monocarboxylic acids such as acrylic acid and methacrylic acid; dicarboxylic acids such as maleic acid, fumaric acid and itaconic acid; dicarboxylic acid monoesters such as monomethyl maleate and monoethyl itaconate, etc.

Metals constituting ethylenically unsaturated carboxylic acid metal salts are not particularly limited, and are usually beryllium, magnesium, calcium, strontium, barium, titanium, chromium, molybdenum, manganese, iron, cobalt, nickel, copper, silver, zinc, cadmium, aluminum, tin, lead, antimony, etc., and among them, zinc, magnesium, calcium and aluminum are preferred in view of characteristics of rubber articles.

These ethylenically unsaturated lower carboxylic acid metal salts may be compounded in the form of metal salt with rubber when they are compounded with other components and kneaded to prepare rubber compositions, or they may be formed by adding the above ethylenically unsaturated lower carboxylic acids and oxides, hydroxides or carbonates of the above metals and reacting them during operations such as kneading.

The use amount of the ethylenically unsaturated lower carboxylic acid metal salt is not particularly limited, but is usually in the range of 3 to 120 parts by weight, preferably 5 to 100 parts by weight per 100 parts by weight of rubber. The use thereof in an amount under 3 parts by weight or above 120 parts by weight is not preferred because such use has a bad influence on the strength characteristics of rubber articles.

In this invention, it is requisite to use a metal salt of higher fatty acid. This metal salt may be one having such structure that a higher fatty acid having one or two or more carboxyl groups and a metal are linked through ion bond.

As higher fatty acids, those having 6 or more carbon atoms can be used, but those having 8 to 30 carbon atoms and particularly those having 10 to 22 carbon atoms are preferred in view of balance between mold releasability and characteristics of rubber articles. Further, fatty acids may be saturated acids or unsaturated acids, and monobasic acids are preferred to polybasic acids. Higher fatty acids may be substituted with a functional group, and in that case the number of carbon contained in the functional group is not included in the above carbon number.

When higher fatty acids having a carbon number under 6 are used, the object of this invention to improve mold releasability cannot be attained.

Examples of higher fatty acids are saturated fatty acids such as caproic acid, caprylic acid, capric acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid and melissic acid; and unsaturated fatty acids such as oleic acid, claidic acid, linolic acid, linolenic acid and arachidonic acid.

Further, metals constituting metal salts of higher fatty acids are not particularly limited, but are usually alkali metals such as lithium, potassium and sodium; alkaline earth metals such as calcium and barium; metals of the zinc group such as zinc and cadmium; metals of the carbon group such as tin and lead; metals of the VIII group such as nickel, etc. In view of characteristics of rubber articles, preferred are alkali metals, alkaline earth metals, zinc group metals and carbon group metals and particularly preferred are lithium, sodium, potassium, calcium, barium, zinc and tin.

The use amount of the higher fatty acid metal salt is 0.5 to 20 parts by weight, preferably 1 to 10 parts by weight per 100 parts by weight of rubber. In a use amount under 0.5 part by weight the effect to improve mold releasability is small. Further, a use amount above 20 parts by weight not only saturates its improving effect but lowers characteristics of the resulting rubber articles, and is not preferred.

In this invention, the mold releasability of the ethylenically unsaturated lower carboxylic acid metal salt-containing rubber composition can be increased by making the composition further contain zinc oxide in addition to the higher fatty acid metal salt.

The amount of zinc oxide to be contained is preferably 20 parts by weight or less and more preferably 10 parts by weight or less per 100 parts by weight of the rubber. Use beyond 20 parts by weight not only saturates the mold releasability-improving effect but lowers characteristics of the resulting rubber articles, and is thus not preferred.

The rubber composition of this invention can be obtained by compounding rubber, an ethylenically unsaturated lower carboxylic acid metal salt and a higher fatty acid metal salt and optionally zinc oxide.

The order of compounding of these components is not particularly limited, and any of methods may be adopted which are a method comprising adding each component successively in optional order, a method comprising adding to a composition obtained by previously kneading optional compounds the remaining components and kneading the mixture, a method comprising adding all the components at the same time and kneading the mixture, and the like. Further, in each of the above methods each component may be added in division in an optional ratio.

The method of kneading is not particularly limited, and kneading can be carried out using a Banbury mixer, a roll mill or the like. The temperature of kneading is not particularly limited, but is usually in the temperature range of room temperature to 150° C.

Various chemicals usually used in the rubber industry can, if necessary, be added to the rubber composition of this invention, for example a reinforcer such as carbon black or silica; a filler such as calcium carbonate or talc; a crosslinking agent such as triallyl isocyanurate or trimethylolpropane; a plasticizer; a stabilizer; a processing agent; and a colorant.

The rubber composition of this invention can be molded into various rubber articles by a known molding method such as molding with a mold, injection molding or transfer molding.

This invention is more specifically described below by examples. Parts and % in the present examples are based on weight unless otherwise noted.

In the present examples, tests on mold releasability and various other physical properties were carried out by the following methods.

Mold releasability

Judged based on the number of times in which repeat of the following pressing operation was possible and the degree of adhesion of rubber.

Specimens each about 25 mm longitudinal, about 40 mm horizontal and about 2 mm thick are prepared from an unvulcanized rubber composition. This specimen (about 5 g) is held between two hard chrome-plated plates and pressed at 170° C. and at a pressure of 100 kg/cm$^2$ for 20 minutes. Then, pressing is stopped and the chrome-plated plates are detached and the degree of adhesion of rubber onto the chrome-plated plates is judged by visual observation in accordance with the following criterion. Then, when rubber is adhering onto the plates, it is removed, and thereafter the pressing operation is repeated using a new specimen. This pressing operation is repeated until the chrome-plated plates become hard to detach (maximum 10 times).

⊚: No rubber is adhering
○: Slight rubber is adhering
△: Some rubber is adhering
×: A large quantity of rubber is adhering

Tensile test

Carried out according to JIS K6301 (specimen=No. 3 dumbbell; tensile speed=500 mm/min.)

Hardness test

Carried out according to JIS K 6301 (expressed by JIS hardness A)

Tear test

Carried out according to JIS K6301 (JIS B type specimens are used and measurement is carried out at a tensile speed of 500 mm/min.)

EXAMPLE 1

100 parts by weight of hydrogenated nitrilebutadiene copolymer rubber (the amount of bound acrylonitrile =36%; iodine value=27; Mooney viscosity at 100° C.=78), 85 parts of zinc methacrylate, 1.5 parts of Nowgard 445 (an amine antioxidant produced by Uniroyal Co.), 5.0 parts of peroxidized butyl (Vulcap 40 KE produced by Hercules Co.; purity=40%) and 5.0 parts of one of various metal salts of stearic acid shown in Table 1 were roll-kneaded at 50° C. to obtain unvulcanized rubber compositions shown in Table 1.

A mold releasability test on these unvulcanized rubber compositions and a tensile test on vulcanizates obtained therefrom were carried out. The results are shown in Table 1.

Further, for comparison, the same experiments as above were carried out except that a commercial silicone oil was used in place of the higher fatty acid metal salts. The results are also shown in Table 1.

TABLE 1

| Metal salt of stearic acid | None | Lithium salt | Sodium salt | Zinc salt | Tin salt | Lead salt | Nickel salt | Silicone oil |
|---|---|---|---|---|---|---|---|---|
| Number of times in which pressing was possible | 2 | >10 | >10 | >10 | >10 | >10 | >10 | 5 |
| Degree of adhesion of rubber | X | ⊚ | ⊚ | ⊚ | ⊚ | ⊚ | ○ | X |
| Characteristics of vulcanizate | | | | | | | | |
| Tensile strength (kg/cm$^2$) | 432 | 350 | 419 | 406 | 373 | 327 | 277 | 205 |
| Elongation at the fractured time (%) | 230 | 317 | 297 | 313 | 279 | 217 | 143 | 311 |
| Hardness | 95 | 92 | 93 | 93 | 92 | 93 | 94 | 87 |
| Tear strength | 91 | 74 | 85 | 78 | 71 | 82 | 75 | 40 |
| Surface states | irregular | smooth | smooth | smooth | smooth | smooth | smooth | sticky |

From the results shown in Table 1, it is seen that the rubber compositions of this invention containing metal salts of stearic acid have good mold releasability, and, in comparison with the case where the so far used mold release agent was used, are excellent in the characteristic of the vulcanizates.

EXAMPLE 2

The same tests as in Example 1 were carried out except that metal salts of various higher fatty acids shown in Table 2 were used in place of the stearic acid metal salts. The results are shown in Table 2.

TABLE 2

| Higher fatty acid Metal salt | None | C 10 Ca salt | Lauric acid Ca salt | Lauric acid Ba salt | Lauric acid Zn salt | C 18 Calcium salt | C 22 Calcium salt | C 28 K salt |
|---|---|---|---|---|---|---|---|---|
| Number of times in which pressing was possible | 2 | >10 | >10 | >10 | >10 | >10 | >10 | 8 |
| Degree of adhesion of rubber | X | ⊚ | ⊚ | ⊚ | ⊚ | ⊚ | ⊚ | ○ |
| Characteristics of vulcanizate | | | | | | | | |
| Tensile strength (kg/cm$^2$) | 432 | 384 | 338 | 365 | 352 | 361 | 365 | 322 |
| Elongation at the fractured time (%) | 234 | 265 | 297 | 311 | 293 | 293 | 308 | 317 |
| Hardness | 95 | 95 | 92 | 92 | 92 | 93 | 93 | 92 |
| Tear strength | 91 | 81 | 71 | 73 | 73 | 75 | 77 | 74 |

(Note) C 10: capric acid, C 18: stearic acid, C 22: behenic acid, C 28: montanic acid From the results shown in Table 2, it is seen that rubber compositions having good mold releasability and vulcanizate characteristics can be obtained even by changing the kind of higher fatty acid metal salts.

EXAMPLE 3

The same tests as in Example 1 were carried out except that the amount of the stearic acid metal salt was changed as shown in Table 3. The results are shown in Table 3.

TABLE 3

| Addition amount of potassium stearate (part) | 0 | 2.5 | 5 | 7.5 | 10 |
|---|---|---|---|---|---|
| Number of times in which pressing was possible | 2 | 6 | >10 | >10 | >10 |
| Degree of adhesion of rubber | X | Δ | ⊚ | ⊚ | ⊚ |
| Characteristics of vulcanizate | | | | | |
| Tensile strength (kg/cm$^2$) | 428 | 420 | 379 | 321 | 224 |
| Elongation at the fractured time (%) | 231 | 303 | 328 | 320 | 317 |
| Hardness | 95 | 94 | 94 | 92 | 88 |
| Tear strength | 90 | 82 | 79 | 58 | 43 |

EXAMPLE 4

The same tests as in Example 1 were carried out except that 2.5 parts by weight of potassium stearate was used as the stearic acid metal salt and zinc oxide was compounded in quantities shown in Table 4. The results are shown in Table 4.

TABLE 4

| Addition amount of zinc oxide (part) | 0 | 5 | 10 | 15 | 20 |
|---|---|---|---|---|---|
| Number of times in which pressing was possible | 6 | 9 | >10 | >10 | >10 |
| Degree of adhesion of rubber | Δ | ○ | ⊚ | ⊚ | ○ |
| Characteristics of vulcanizate | | | | | |
| Tensile strength (kg/cm$^2$) | 420 | 425 | 402 | 394 | 354 |
| Elongation at the fractured time (%) | 303 | 308 | 298 | 276 | 240 |
| Hardness | 94 | 94 | 94 | 93 | 93 |
| Tear strength | 82 | 83 | 81 | 80 | 50 |

From the results shown in Table 4, it is seen that it is possible to further enhance mold releasability by further compounding zinc oxide in addition to the higher fatty acid metal salt.

From data shown in the above examples, it is seen that by this invention is provided an ethylenically unsaturated carboxylic acid metal salt-containing rubber composition giving rubber articles having excellent mold releasability and vulcanizate characteristics.

What we claim is:

1. An ethylenically unsaturated lower carboxylic acid metal salt-containing rubber composition comprising (A) rubber, (B) an ethylenically unsaturated lower carboxylic acid metal salt and (C) a higher fatty acid metal salt which is incorporated in the composition as a metal salt.

2. An ethylenically unsaturated lower carboxylic acid metal salt-containing rubber composition comprising (A) rubber, (B) an ethylenically unsaturated lower carboxylic acid metal salt, (C) a higher fatty acid metal salt, which is incorporated in the composition as a metal salt, and (D) zinc oxide.

3. The composition of claim 1 comprising 100 parts by weight of component (A), 3 to 120 parts by weight of component (B) and 0.5 to 20 parts by weight of component (C).

4. The composition of claim 2 comprising 100 parts by weight of compound (A), 3 to 120 parts by weight of component (B), 0.5 to 20 parts by weight of component (C) and an effective amount of 20 parts by weight or less of component (D).

5. The composition of any of claims 1 to 4 wherein component (B) is a metal salt of ethylenically unsaturated lower carboxylic acid having 5 or less carbon atoms, exclusive of the carboxyl groups.

6. The composition of any of claims 1 to 4 wherein component (C) is a metal salt of higher fatty acid having 6 to 30 carbon atoms.

7. The composition of claim 4 wherein the component (C) higher fatty acid metal salt contains 10 to 28 carbon atoms.

8. An ethylenically unsaturated lower carboxylic acid metal salt-containing rubber composition comprising
(A) rubber in an amount of 100 parts by weight,
(B) an ethylenically unsaturated carboxylic acid containing 1 to 2 carboxyl groups and 1 to 5 carbon atoms, exclusive of the carboxyl groups, in an amount of 5 to 100 parts by weight, and
(C) a $C_{10}$ to $C_{28}$ fatty acid metal salt in an amount of 5.0 to 20 parts by weight.

9. The composition of claim 8 wherein the fatty acid metal salt is incorporated in the composition as a metal salt.

10. An ethylenically unsaturated lower carboxylic acid metal salt-containing rubber composition comprising
(A) rubber in an amount of 100 parts by weight,
(B) an ethylenically unsaturated carboxylic acid containing 1 to 2 carboxylic acid groups and 1 to 5 carbon atoms, exclusive of the carboxyl groups in an amount of 5 to 100 parts by weight,
(C) a $C_{10}$ to $C_{28}$ fatty acid metal salt in an amount of 5.0 to 20 parts by weight, and
(D) zinc oxide in an amount of 5 to 20 parts by weight.

11. The composition of claim 10 wherein the fatty acid metal salt is incorporated in the composition as a metal salt.

12. A method for preparing an ethylenically unsaturated lower carboxylic acid metal salt-containing rubber composition which comprises mixing together
(A) rubber,
(B) an ethylenically unsaturated lower carboxylic acid metal salt, and
(C) a higher fatty acid metal salt.

13. The method of claim 12, wherein the components are mixed in the following proportions
(A) rubber in an amount of 100 parts by weight,
(B) an ethylenically unsaturated lower carboxylic acid in an amount of 3 to 120 parts by weight, and
(C) a fatty acid metal salt in an amount of 2.5 to 20 parts by weight.

14. The method of claim 12, wherein the components are as follows and are mixed in the following proportions
(A) rubber in an amount of 100 parts by weight,
(B) an ethylenically unsaturated carboxylic acid containing 1 to 2 carboxylic groups and 1 to 5 carbon atoms, exclusive of the carboxyl groups, in an amount of 5 to 100 parts by weight, and
(C) a $C_{10}$ to $C_{28}$ fatty acid metal salt in an amount of 5.0 to 20 parts by weight.

15. A method for preparing an ethylenically unsaturated lower carboxylic acid metal salt-containing rubber composition which comprises mixing together
(A) rubber,
(B) an ethylenically unsaturated lower carboxylic acid metal salt,
(C) a higher fatty acid metal salt, and
(D) zinc oxide.

16. The method of claim 15, wherein the components are mixed in the following proportions
(A) rubber in an amount of 100 parts by weight,
(B) an ethylenically unsaturated lower carboxylic acid in an amount of 3 to 120 parts by weight,
(C) a fatty acid metal salt in an amount of 2.5 to 20 parts by weight, and
(D) zinc oxide in an effective amount of 20 parts by weight or less.

17. The method of claim 15, wherein components are as follows and are mixed in the following proportions
(A) rubber in an amount of 100 parts by weight
(B) an ethylenically unsaturated carboxylic acid containing 1 to 2 carboxyl groups and 1 to 5 carbon atoms, exclusive of the carboxyl groups, in an amount of more than 5 up to 100 parts by weight,
(C) a $C_{10}$ to $C_{28}$ fatty acid metal salt in an amount of 5.0 to 20 parts by weight, and
(D) zinc oxide in an amount of 5 to 20 parts by weight.

* * * * *